UNITED STATES PATENT OFFICE.

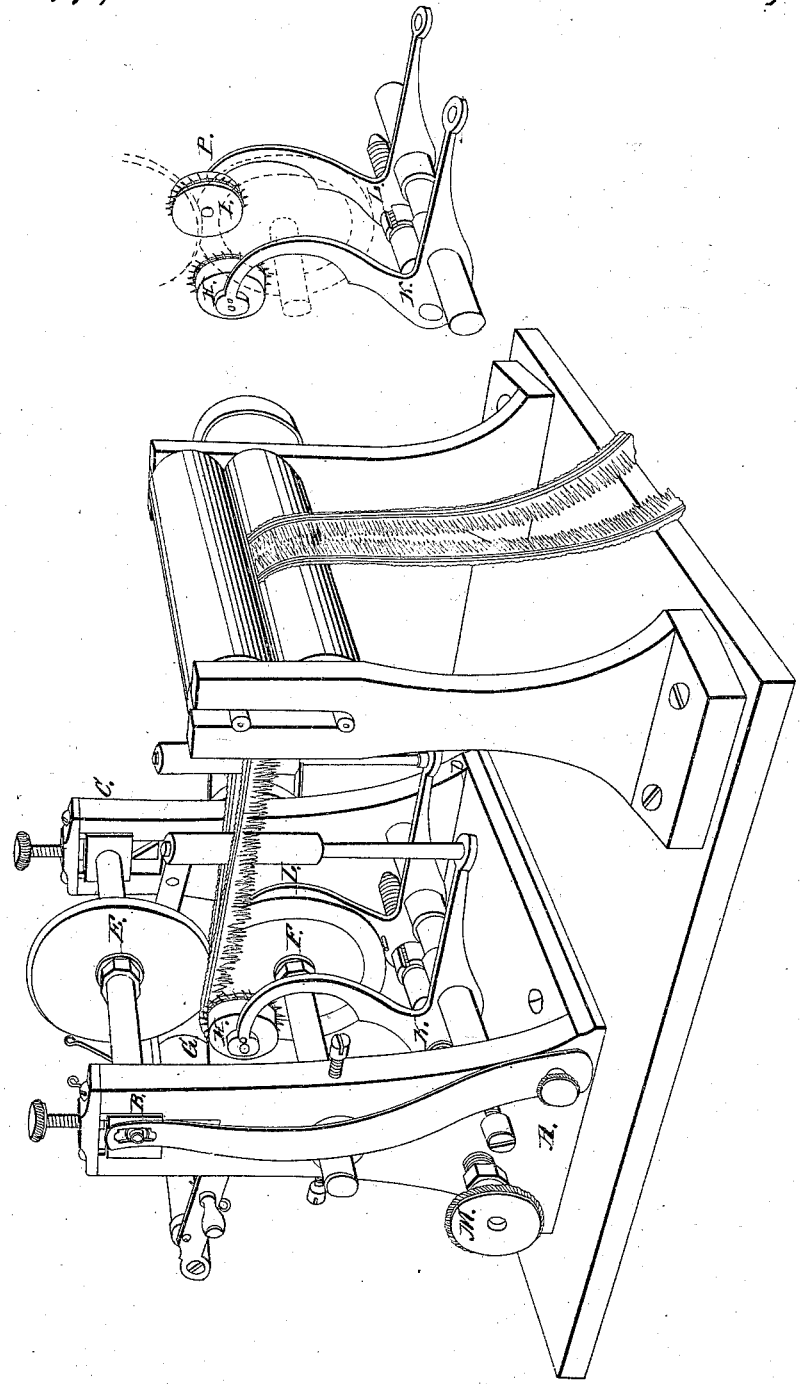

WM. J. HORSTMANN, OF PHILADELPHIA, PENNSYLVANIA.

MACHINE FOR CUTTING FRINGES.

Specification of Letters Patent No. 16,977, dated April 7, 1857.

*To all whom it may concern:*

Be it known that I, WILLIAM J. HORSTMANN, of the city of Philadelphia and State of Pennsylvania, have invented a new and useful Improvement in Apparatus for Cutting Fringes; and I do hereby declare the following to be a full and exact description of the same, reference being had to the annexed drawing, making a part of this specification, in which—

Figure 1 represents a perspective view of my improved apparatus and, Fig. 2 a similar view of a detached part.

Heretofore fringes have been manufactured double and slit down the middle so as to form two single fringes by hand scissors in the ordinary way. This is tedious, expensive and oftentimes inaccurate.

My improvement consists in the employment of two circular cutters or shears in combination with two feeding wheels or rollers so constructed as to distend the fringe and hold it firmly and in the proper position while under the action of the circular cutters or shears.

A, B, C, D, is an upright frame supporting the several parts.

E and F are the circular steel shears turning on axles or small shafts and made to revolve by a pulley or cog gearing from the main driving power. These circular shears revolve in contact at one point as shown in the drawing. The fringe is fed in at the point G toward the circular shears by means of two rollers H and I shown detached in Fig. 2. These rollers are surmounted by short projections or pins which catch the fringe and gradually stretch it transversely as they revolve so that by the time the fringe passes between the point of contact of the circular shears E and F it is brought to the proper transverse tension and the fringe is so held and kept that the central point of the fringe always passes between the point of contact of the cutters and thus the fringe is always accurately bisected. In order to effect this end the pins must always describe in revolution two circles whose planes make an acute angle with each other and the plane of the rotary shears must bisect that angle. In the drawing the axles of the wheels H and I which support the pins are supported on standards K and L at the points M and N. The standards at these points being bent parallel to the planes of the wheels H and I, respectively. The effect of this is to cause the planes of the revolution of these wheels always to make an acute angle with the planes of the cutters.

Instead of the small pin wheels or rollers as described above rollers of much larger diameter might be used or bands with similar projections moving over two wheels or rollers could be used for feeding the fringe to the cutters but in every such case it is important that the plane described by the points of the pins forms an acute angle with the plane of the cutters.

The feeding rollers H and I are adjusted to a greater or less distance from the cutters and so as to preserve at the same time the W inclination and relative equidistance by means of a right and left screw which passes through female screws formed on the lower part of the standards K and L. This enables the apparatus to operate equally well on any width of fringes. If it be desired however to cut the fringes of unequal length as for example two inches on one side of the cutter and one inch on the other side the screw is so constructed as to admit of this action.

Having thus described my improvement what I claim as my invention and desire to secure by Letters Patent is—

The combination of the circular cutters and the feeding rollers H and I arranged and operating substantially as above described.

WM. J. HORSTMANN.

Witnesses:
C. BRAZER,
J. H. B. JENKINS.